United States Patent
Michalski et al.

(10) Patent No.: US 11,748,437 B2
(45) Date of Patent: Sep. 5, 2023

(54) SYSTEM AND METHOD FOR MANAGEMENT OF COMMERCIAL VIRTUAL ASSISTANT SERVICES

(71) Applicants: MOTOROLA SOLUTIONS, INC., Chicago, IL (US); Piotr Michalski, Cracow (PL); Pawel Wilkosz, Wisniowa (PL); Pawel Niemiec, Rzeszow (PL)

(72) Inventors: Piotr Michalski, Cracow (PL); Pawel Wilkosz, Wisniowa (PL); Pawel Niemiec, Rzeszow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 80 days.

(21) Appl. No.: 17/603,106

(22) PCT Filed: Apr. 26, 2019

(86) PCT No.: PCT/PL2019/050025
§ 371 (c)(1),
(2) Date: Oct. 12, 2021

(87) PCT Pub. No.: WO2020/218929
PCT Pub. Date: Oct. 29, 2020

(65) Prior Publication Data
US 2022/0188372 A1    Jun. 16, 2022

(51) Int. Cl.
*G06F 16/957* (2019.01)
*G06F 16/9538* (2019.01)
*H04L 67/568* (2022.01)

(52) U.S. Cl.
CPC ...... *G06F 16/9574* (2019.01); *G06F 16/9538* (2019.01); *H04L 67/568* (2022.05)

(58) Field of Classification Search
CPC ............. G06F 16/9574; G06F 16/9538; H04L 65/00–65/80
See application file for complete search history.

(56) References Cited

U.S. PATENT DOCUMENTS 6,642,844 B2   11/2003  Montague
8,977,681 B2 *  3/2015  Zhu ........................ H04L 67/61
                                              709/200

(Continued)

OTHER PUBLICATIONS

Godfrey Pet al: 'Answering Queries by Semantic Caches', Electronic Publishing, Artistic Imaging, and Digital Typography; [Lecture Notes in Computer Science , ISSN 0302-9743], Springer Verlag, DE,vol. 1677, Jan. 1, 1999 (Jan. 1, 1999), pp. 485-498, XP002299758, DOI: 10.1007/3-540-48309-845, ISBN: 978-3-540-24128-7—section '2.2 Applications'.

*Primary Examiner* — Clayton R Williams (57) ABSTRACT

Techniques for management of commercial virtual assistant services are provided. The techniques include receiving a query from a user within an organization. The techniques include determining if generating at least a portion of a response to the query will require use of a paid service and determining if at least one other virtual assistant within the organization has cached information usable to generate the at least a portion of the response to the query that requires use of the paid service. The techniques further include determining if the information cached by the at least one other virtual assistant is valid based in part on the query and receiving the information from the at least one other virtual assistant when the cached information is valid and include generating the at least a portion of the response to the query that requires use of the paid service using the received information.

19 Claims, 7 Drawing Sheets

(56) References Cited

U.S. PATENT DOCUMENTS

| | | |
|---|---|---|
| 9,130,846 B1 * | 9/2015 | Szabo .................. H04L 41/0893 |
| 9,369,823 B2 | 6/2016 | Dharawat et al. |
| 9,444,772 B2 | 9/2016 | Ventilla et al. |
| 10,791,447 B2 | 9/2020 | Bryla et al. |
| 2002/0026266 A1 | 2/2002 | Montague |
| 2004/0059719 A1 | 3/2004 | Sugiyama |
| 2013/0018918 A1 | 1/2013 | Peek |
| 2013/0138267 A1 | 5/2013 | Hignite et al. |
| 2014/0006434 A1 | 1/2014 | Chervirala et al. |
| 2014/0280294 A1 | 9/2014 | Stekkelpak et al. |
| 2015/0133076 A1 | 5/2015 | Brough |
| 2015/0244827 A1 * | 8/2015 | Chen ....................... H04L 67/02 |
| | | 709/213 |
| 2016/0203148 A1 | 7/2016 | Allen et al. |
| 2017/0084091 A1 | 3/2017 | McQuade et al. |
| 2017/0155712 A1 * | 6/2017 | Pang .................... G06F 16/2228 |
| 2017/0318123 A1 | 11/2017 | Amrhein et al. |
| 2019/0130039 A1 | 5/2019 | Fang et al. |

\* cited by examiner

SYSTEM AND METHOD FOR MANAGEMENT OF COMMERCIAL VIRTUAL ASSISTANT SERVICES

BACKGROUND

Virtual assistants (VA) have become ubiquitous. Devices, such as Amazon's Alexa and Google's Home, can be found in an ever growing number of houses. Virtual assistants are also not limited to specific, purpose built devices. Most smartphones offer some type of virtual assistant. For example, Google Assistant is available on most Android based smartphones while Apple's Siri can be found on most iPhones. A user may query a virtual assistant, which may then access one or more data sources and generate a relevant response to the query. For example, a user may ask a virtual assistant what is the current weather. The virtual assistant may determine the user's location, query a weather database, and respond with the current weather conditions in the user's location.

Virtual assistant use cases are also being expanded beyond the consumer space into commercial and government environments. For example, in the public safety space, a virtual assistant, which may be referred to as a virtual partner, may provide functionality to help public safety personnel perform their jobs. For example, a police officer who has taken an individual into custody may verbally ask his virtual partner to run an outstanding arrest warrant check on the individual's name, to determine if the individual is a wanted person. The virtual partner may query an arrest warrant database to determine if the individual has any outstanding warrants. By using the virtual partner's audio interface, the officer does not have to interact with a device (e.g. perform the same query using a squad car mounted laptop computer) using his eyes and hands, thus allowing the officer to remain "eyes up, hands free," thus improving officer safety.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Initially, in an attempt to increase usage and increase market share, many virtual assistants did not charge for the virtual assistant service. For example, aside from a nominal cost of purchasing one of the various types of Alexa devices, there is no additional cost, regardless of the number of queries presented. This model has begun to change. For example, many virtual assistants may be customized with the inclusion of paid commercial capabilities (e.g. paid skills). Thus, when a user wishes to use one of these capabilities, they may be charged a fee (e.g. per use fee, subscription fee, etc.). For example, the ability to control you cable television set top box from your virtual assistant may be offered as a paid skill from the cable television provider.

In another model, the capabilities themselves may be offered for free, but the capability may require use of a paid service to access data necessary to respond to a user query. For example, a weather checking capability may be offered as a service without a fee, but the service itself, depending on the location being queried, may need to access a paid weather database to obtain current weather information for the location. In other words, the user may not pay directly for the capability itself, but rather may be responsible for paid services that the capability requires to operate.

In yet another model, the user may utilize a paid database service directly. For example, LexisNexis is a paid database which includes a vast assortment of content. A user may ask their virtual assistant to directly retrieve a piece of content from a paid database (e.g. "Retrieve the front page article of today's newspaper from LexisNexis.").

A problem arises when virtual assistants are being used by organizations who may allow use of paid resources (e.g. paid capabilities, paid content accessed by capabilities, or paid content accessed directly, etc.). In many cases, the same query may be asked by multiple members of the organization. Each query would make use of the paid resources to process the query, even though the query would be returning the same results. In effect, the organization would be paying multiple times for the same information.

The techniques described herein solve this problem and others. When a user poses a query to the virtual assistant, the virtual assistant queries a knowledge base within the organization to determine if responding to the query would require the use of a paid resource. If not, the query may proceed. If responding to the query would require, at least in part, use of a paid resource, the virtual assistant may then query all other virtual assistants within the organization to determine if any of those virtual assistants have previously performed the query and have cached the results. If not, the virtual assistant may utilize the paid resource to respond to the query. The virtual assistant may also cache the response as well as information related to the time the information was received from the paid resource.

If the result of querying other virtual assistants within the organization indicates that at least one other virtual assistant has the information necessary to generate a response, the virtual assistant may query the virtual assistant which has the information about the time the information was cached. If the response indicates that information was cached recently enough that it still has value, based on the nature of the query, then the information may be provided to the requesting virtual assistant. Otherwise, the requesting virtual assistant may utilize the paid resource. What should be noted is that the value of the cached information is based on the nature of the original query, not a static expiration timer.

For example, consider the use case of an airline ground crew. A crew member may want to know if he should wear a jacket onto the tarmac and may ask his virtual assistant what the weather outside is like. Assume obtaining weather information is a paid service. The virtual assistant may query other virtual assistants to see if anyone has weather information cached, and may receive a response indicating that another virtual assistant has the weather information, but it is three hours old. Since weather generally changes slowly, and the query was a general request for information about the weather, the virtual assistant may determine the data, even though it is three hours old, still has value. The virtual assistant may obtain the information from the virtual assistant that has cached the information and respond to the crew members query using that information.

Consider the same airline ground crew member who may need to determine if there are hazardous weather conditions that may affect how the next incoming flight is handled. The crew member may ask his virtual assistant if there are any hazardous weather conditions that may affect the next incoming flight. Again, the virtual assistant may query other virtual assistants to see if anyone has weather information cached, and may again receive a response indicating that another virtual assistant has the weather information, but it is three hours old. However, in this case, the nature of the query (e.g. hazards that may affect a flight) may be sufficiently critical such that three hours old information has no value. In such a case, the virtual assistant would query the paid service to obtain the most up to date information.

A method is provided. The method comprises receiving, at a virtual assistant, a query from a user within an organization. The method includes determining if generating at least a portion of a response to the query will require use of a paid service. The method further includes determining if at least one other virtual assistant within the organization has cached information usable to generate the at least a portion of the response to the query that requires use of the paid service. The method also includes determining if the information cached by the at least one other virtual assistant is valid based in part on the query. The method further includes receiving the information from the at least one other virtual assistant when the cached information is valid. The method also includes generating the at least a portion of the response to the query that requires use of the paid service using the received information.

In one aspect, determining if at least one other virtual assistant within the organization has cached information usable to generate the at least a portion of the response to the query that requires use of the paid service further comprises sending a query to other virtual assistants within the organization to determine if any of the other virtual assistants has cached the information. The method further includes receiving a response from at least one virtual assistant within the organization indicating the at least one virtual assistant has cached the information.

In one aspect, determining if the cached information is valid further comprises sending an expiration query to the at least on virtual assistant that has cached the information to determine if the cached information has expired. The method further includes receiving a response indicating if the cached information has expired. In one aspect, receiving a response indicating if the cached information has expired further includes determining how long ago the cached information expired, wherein determining if the cached information is valid further comprises determining the cached information is valid when the cached information has expired within a confidence threshold.

In one aspect, the method further comprises determining that no other virtual assistant within the organization has cached information usable to generate the at least a portion of the response to the query that requires use of the paid service. The method further includes sending the query to the paid service. The method further includes sending the query to the paid service. The method further includes receiving the information from the paid service. The method also includes caching the information from the paid service. The method further includes storing an expiration time of the cached information.

In one aspect, the method further includes removing the information from the cache based on the expiration time. In one aspect the method further comprises determining if at least one other virtual assistant within the organization has already queried the paid service for the information. The method also includes waiting until the at least one other virtual assistant within the organization receives the information from the paid service. In one aspect, the method further comprises determining if at least one other virtual assistant within the organization is preparing to query the paid service for the information. The method further comprises negotiating with the at least one other virtual assistant to determine which virtual assistant will send the query to the paid service, wherein the virtual assistant that does not perform the query to the paid service will receive the information from the cache of the virtual assistant that does perform the query to the paid service.

A system is provided. The system includes a processor and a non-transitory processor readable medium coupled to the processor and containing thereon a set of instructions that when executed by the processor cause the processor to receive, at a virtual assistant, a query from a user within an organization. The instructions further cause the processor to determine if generating at least a portion of a response to the query will require use of a paid service. The instructions further cause the processor to determine if at least one other virtual assistant within the organization has cached information usable to generate the at least a portion of the response to the query that requires use of the paid service. The instructions further cause the processor to determine if the information cached by the at least one other virtual assistant is valid based in part on the query. The instructions further cause the processor to receive the information from the at least one other virtual assistant when the cached information is valid. The instructions further cause the processor to generate the at least a portion of the response to the query that requires use of the paid service using the received information.

In one aspect the instructions to determine if at least one other virtual assistant within the organization has cached information usable to generate the at least a portion of the response to the query that requires use of the paid service further comprises instructions to send a query to other virtual assistants within the organization to determine if any of the other virtual assistants has cached the information. The instructions further cause the processor to receive a response from at least one virtual assistant within the organization indicating the at least one virtual assistant has cached the information.

In one aspect, determining if the cached information is valid further comprises instructions to send an expiration query to the at least on virtual assistant that has cached the information to determine if the cached information has expired. The instructions further cause the processor to receive a response indicating if the cached information has expired. In one aspect, the instructions to receive a response indicating if the cached information has expired further includes instructions to determine how long ago the cached information expired, wherein determining if the cached information is valid further comprises instructions to determine the cached information is valid when the cached information has expired within a confidence threshold.

In one aspect, the instructions further cause the processor to determine that no other virtual assistant within the organization has cached information usable to generate the at least a portion of the response to the query that requires use of the paid service. The instructions further cause the processor to send the query to the paid service. The instructions further cause the processor to receive the information from the paid service. The instructions further cause the processor to cache the information from the paid service. The instructions further cause the processor to store an expiration time of the cached information.

In one aspect, the instructions further cause the processor to remove the information from the cache based on the expiration time. In one aspect, the instructions further cause the processor to determine if at least one other virtual assistant within the organization has already queried the paid service for the information. The instructions further cause the processor to wait until the at least one other virtual assistant within the organization receives the information from the paid service.

In one aspect, the instructions further cause the processor to determine if at least one other virtual assistant within the organization is preparing to query the paid service for the information. The instructions further cause the processor to negotiate with the at least one other virtual assistant to determine which virtual assistant will send the query to the paid service, wherein the virtual assistant that does not perform the query to the paid service will receive the information from the cache of the virtual assistant that does perform the query to the paid service.

A method is provided. The method includes receiving, at a first virtual assistant, a query for information, the query generated by a second virtual assistant. The method further includes determining if the information is included in a cache of the first virtual assistant. The method further includes sending an indication to the second virtual assistant when it is determined that the information is included in the cache.

In one aspect, the method includes receiving an expiration query from the second virtual assistant. The method further includes determining if the information has expired, the determination based on an expiration time stored when the information was cached. The method further includes responding to the second virtual assistant with an indication that the information has expired when it is determined, based on the expiration query and the expiration time, that the information has expired.

In one aspect, the method includes sending the information to the second virtual assistant when it is determined the information is included in the cache of the first virtual assistant. In one aspect, the method includes determining if the information has expired, the determination based on an expiration time stored when the information was cached. The method further includes purging the information from the cache based on the determination.

Figure 1:
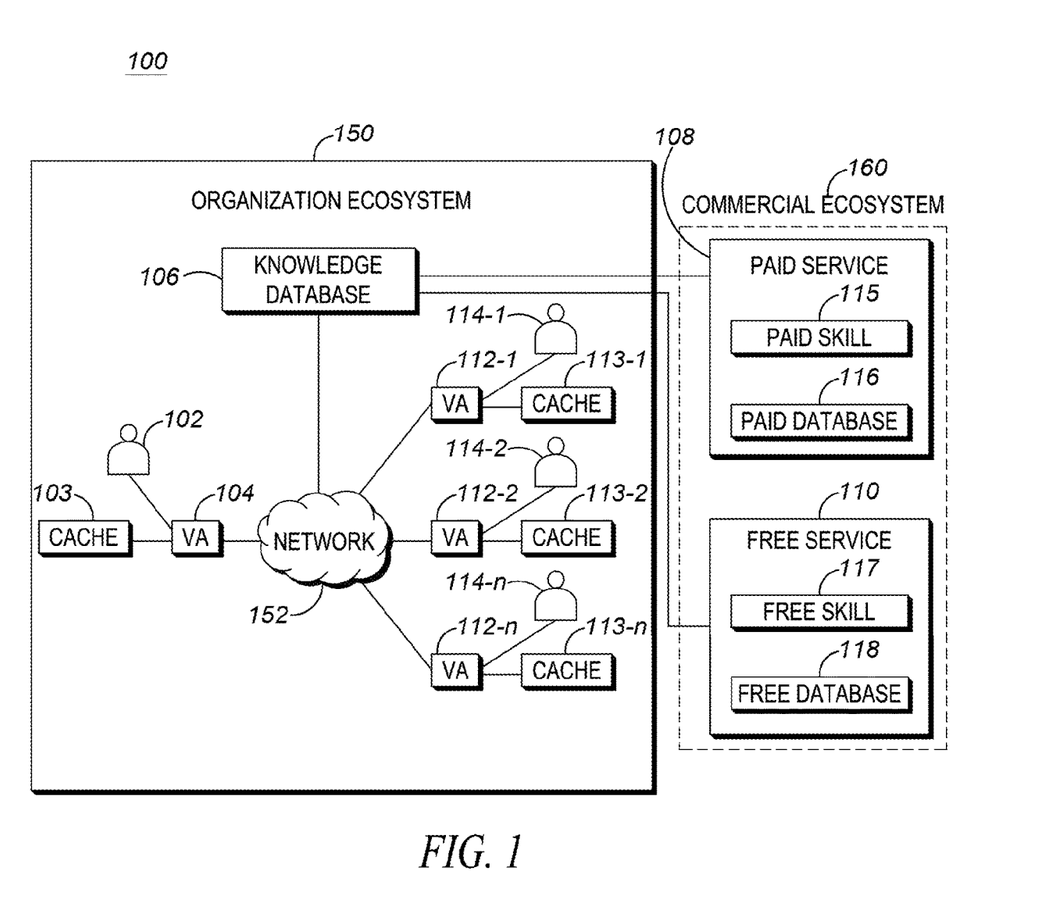
FIG. 1 is an example of an environment that may utilize the management of commercial virtual assistant services techniques described herein.

FIG. 1 is an example of an environment that may utilize the management of commercial virtual assistant services techniques described herein. Environment 100 may generally be divided into two domains. The first being the organization domain 150 and the second being the commercial ecosystem 160.

The organization ecosystem 150 may include users 102 and 114-1 . . . n. These users may be members of the organization, such as employees. Each of these users may be associated with a virtual assistant 104 and 112-1 . . . n. Each of those virtual assistants may be associated with a cache 103 and 113-1 . . . n. The virtual assistants may provide functionality such as allowing a user to submit a voice query and obtain an audio response. Each of the virtual assistants is communicatively coupled via network 152 which allows the virtual assistants to communicate with each other.

Although the virtual assistants shown in FIG. 1 are depicted as separate entities for each user, this is simply for ease of description, and not by way of limitation. In some implementations, each user may have a physical device that implements a virtual assistant. In other implementations, a central server may implement the virtual assistant functionality for all users, but to each user it may appear that they have their own individual virtual assistant. Likewise, although the caches are shown as directly coupled to each individual virtual assistant, in some implementations, the cache functionality may be centrally implemented. What should be understood is that regardless of implementation, each user has access to a virtual assistant and those virtual assistants are able to cache information, particularly information received form paid services, as will be described in further detail below.

Ecosystem 150 may also include knowledge database 106. Knowledge database may include the repository of capabilities (e.g. skills) available to each of the virtual assistants. The knowledge database may also act as an interface for the virtual assistant to access capabilities and information that is outside organization 150. For example, in some cases users may send a query to their own virtual assistant. The virtual assistant may be able to answer the query using information contained within the knowledge repository. As should be clear, in such cases, the query may be answered without the organization incurring any costs or fees as no resources outside the organization are used.

Environment 100 may also include a commercial ecosystem 160. Commercial ecosystem 160 may include resources that are outside of the organization ecosystem 150 and those resources may be provided by $3^{rd}$ parties. Two general types of commercial resources may be available. The first type is paid services 108. The provider of paid services, as the name implies, expects to be paid for offering the service. The service may be a pay per use service, a subscription service, or may utilize any other type of charging structure. The techniques described herein are applicable with any paid service, regardless of the service is paid for.

Paid service 108 can include things such as paid skills (e.g. capabilities) 115. As mentioned above, in some cases a 3$^{rd}$ party may provide a capability that may be used by a virtual assistant for a fee. Paid services may also include access to a paid database 116. Again, as explained above, databases exist that require payment in order to access content.

For the sake of completeness, commercial ecosystem 160 may also include free services 110, such as free skills 117 and free database 118. The resources provided by free services may generally be used in the same way as paid services, with the exception that no additional fees are charged. Thus, in some implementations, there is no downside to repetitive use of free services to obtain duplicative information because there is no cost associated with the duplicate queries. However, it should be noted that the techniques described herein would be equally applicable for free services. For ease of description only, the remainder of the disclosure will focus on use of paid services. This is not to imply that the techniques could not also be utilized with free services.

In operation, as user 102 may send a query to virtual assistant 104. As mentioned above in the airline ground crew example, the user may ask his virtual assistant what is the weather in order to determine if he should wear a jacket out onto the tarmac. Assume that the weather information is provided by a paid service and the weather is updated every hour. The virtual assistant may send the query to the knowledge database 106 to determine if answer the query requires use of a paid service, which in this case it does.

The knowledge database 106 may inform the virtual assistant 104 that the query requires the use of a paid service. Rather than immediately utilize the paid service, the virtual assistant 104 may send a query over network 152 to all other virtual assistants 112-1 . . . n belonging to all other users 114-1 . . . n within the organization to see if any of those virtual assistants has stored the information (e.g. the current weather) in their cache 113-1 . . . n. If not, the virtual assistant 104 may utilize the paid service 108 to obtain the information (e.g. the current weather) in order to respond to the current query. In addition, the virtual assistant will store the information received form the paid service in its cache 103 for potential later use by others, as will be explained in further detail below. In addition to storing the information, the virtual assistant may also store TTL information, which may be used to determine when the cached in formation is no longer valid.

In the case where one of the other virtual assistants 112-1 . . . n responds that it does have the information cached, the virtual assistant 104 may then interact with the virtual assistant 112 that has cached the information to determine if the information is still valid. The validity of cached information is based on the nature of the user query. Information that may be valid for one query may not be valid for a different query. In the instant case, the query was for generalized weather information. Assume the cashed information was hours old, which means there has been at least two updates (since the weather service updates every hour) since this information was cached. Since the nature of the query was a simple weather request, and weather changes relatively slowly, the three-hour old data may be valid. The virtual assistant 104 may request the other virtual assistant 112 to send the cached data and may use that data to respond to the user 102 query.

Continuing with the airline ground crew scenario, the crew member may ask, "What are the expected weather related hazards for the next incoming flight?" The virtual assistant 104 may send this query to the knowledge database, which may determine that both free and paid resources may be required. For example, assume that flight information is available for free, either from within the organization 150 itself or from free services 110. Thus, determining what the next flight is does not require use of a paid service. However, as above, determining the weather does.

The same process described above may occur, where the virtual assistant 104 learns that at least one other virtual assistant 112 has weather information that is three hours old. However, the nature of the query involves a specific request, for a specific time period (e.g. the next incoming flight). Furthermore, the nature of the request involves identify hazards at that particular time. Thus, the virtual assistant 104 may determine that based on the nature of the current query, three-hour old data is no longer valid. The virtual assistant may then query the paid service 108 to obtain the most current data, even though it involves incurring a fee.

What should be understood is that unlike in standard caching, the nature of the query itself is used as a factor in determining if the cached information is valid. Regular caching typically only takes into account how long ago an item was cached, and once the time has passed, the cached item is considered invalid. The techniques described herein examine the nature of the query and if the information exceeds a confidence threshold, the cached information may be used, even if it was cached long ago.

Figure 2:
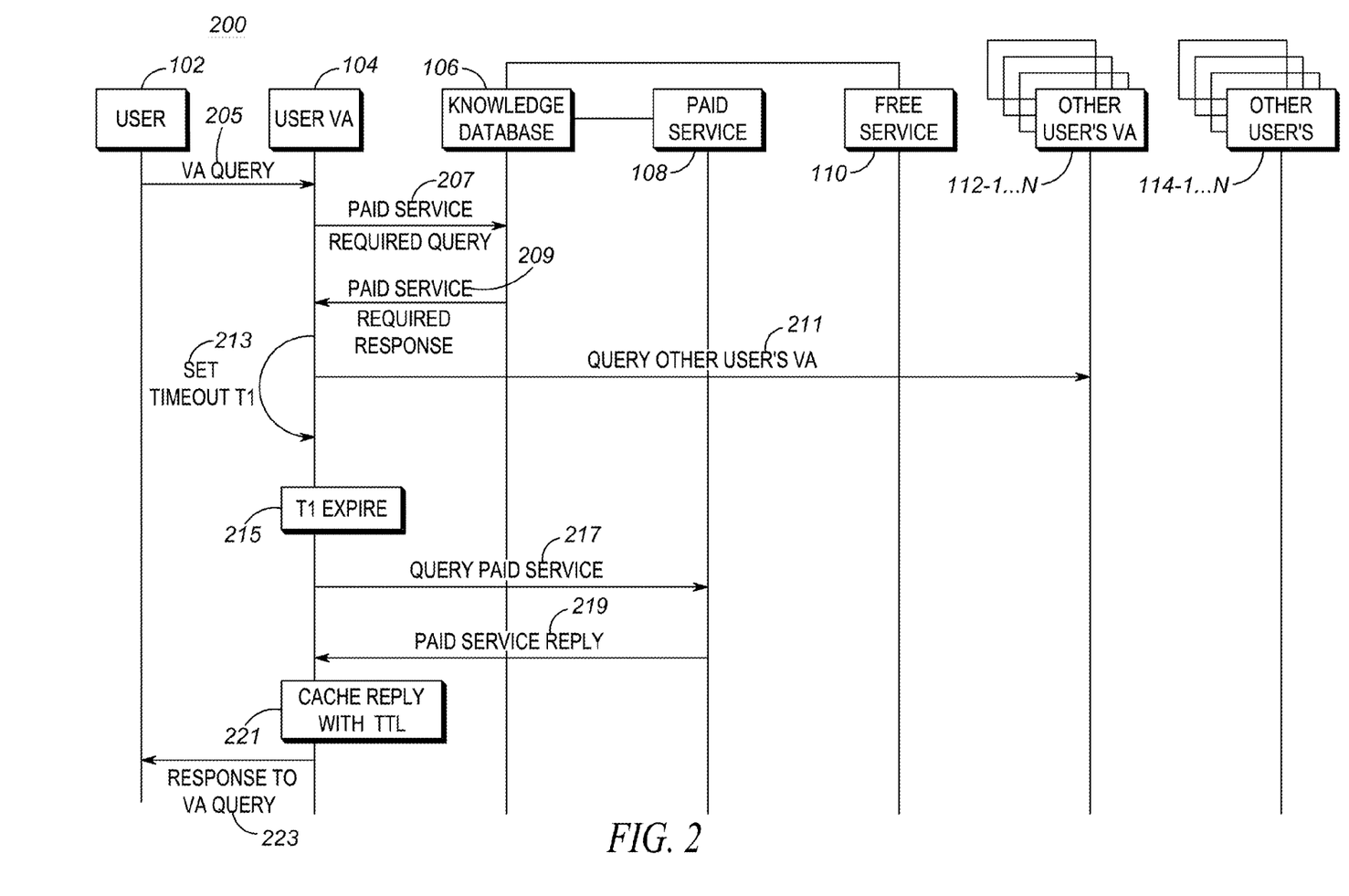
FIG. 2 is an example of a message sequence diagram for managing commercial virtual assistant services when a cached answer is not available.

FIG. 2 is an example of a message sequence diagram for managing commercial virtual assistant services when a cached answer is not available. Sequence diagram 200 includes the elements described with respect to FIG. 1. For example, diagram 200 includes user 102, virtual assistant 104, knowledge database 106, paid service 108, free service 110, a plurality of other user's VA 112-1 . . . n, and a plurality of other users. The elements 102-114 depicted in FIG. 2 are substantially the same as those described with respect to FIG. 1. For purposes of ease of description, the description of those elements is not repeated here.

The user 102 may initiate a query 205 to virtual assistant 104. The virtual assistant may then initiate a paid service required query 207 to knowledge database 106. The knowledge database may determine if a response to the query 205, in whole or in part, would require use of a paid service. As described above, a response to a query may require use of paid services, unpaid services, or both. It should be understood that use of a paid service to generate a portion of a response does not preclude use of a free service to generate other portions of the response. For the remainder of this description, use of a paid service means that at least a portion of a response uses a paid service.

The knowledge database may send a paid service required response 209 indicating if use of a paid service 108 is necessary for generating a response to query 205. If a paid service is not required, the virtual assistant uses free services, if necessary, to respond to the query. For ease of description, the known process of using free services is not shown in the remainder of the disclosure.

When use of paid services is required to respond to query 205, the virtual assistant may query 211 other user's virtual assistants 112 to determine if any of the other user's virtual assistants have the required information from the paid service 108 cached. The virtual assistant 104 may set a timer T1 213 to wait for responses from the other virtual assistants. T1 expiring 215 prior to any response from the other virtual assistants indicates that no other virtual assistant has the required information cached.

Virtual assistant 104 may then query 217 the paid service 108 to obtain the information needed to respond to query 205. The paid service may then send a reply 219 to the virtual assistant, the reply including the information needed in order to respond to the query. The virtual assistant may then cache the reply 221. Caching the reply may also include caching a time indication, such as a time to live (TTL) which may be used to determine the validity of the cached information. Us of the TTL is described in further detail with respect to FIG. 3. The virtual assistant may then respond to the user 102 with the response to the virtual assistant query 223.

Figure 3:
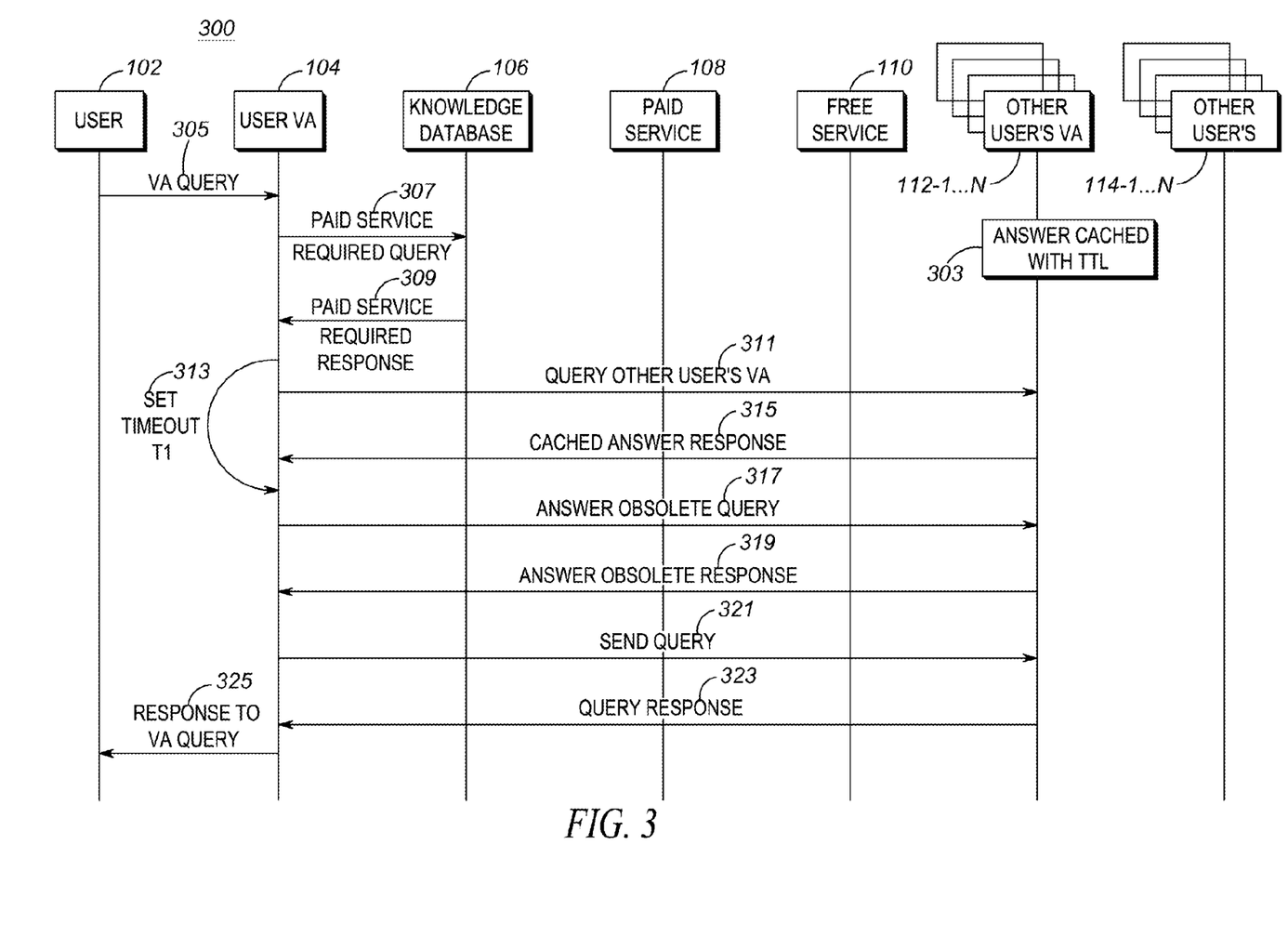
FIG. 3 is another example of a message sequence diagram for managing commercial virtual assistant services when a cached answer is available and is still valid.

FIG. 3 is another example of a message sequence diagram for managing commercial virtual assistant services when a cached answer is available and is still valid. Sequence diagram 300 includes the elements 102-114 described with respect to FIG. 1 and FIG. 2 and the description of those elements is not repeated here. Steps 305-313 are substantially the same as steps 205-213 and the for purposes of clarity, the description of those items is not repeated here.

In FIG. 3, unlike FIG. 2, prior to timer T1 313 expiring, a cached answer response 315 is received from one of the other virtual assistants 112. At this point, virtual assistant 104 is aware that the information needed to respond to the query may be available at one of the other virtual assistants. However, as explained above, even if the information is available, the information may be obsolete. For example, the information may be too old and is no longer applicable. As another example, the nature of the query itself may indicate that the response to the query may require information that was obtained within a certain time period. As described above with respect to the airline ground crew, the same information (e.g. weather retrieved at a particular time) may have or not have value, depending on the particular user query to the virtual assistant.

Virtual assistant 104 may send an answer obsolete query 317 to the other virtual assistant 112 that sent the cached answer response 315 in order to determine if the cached answer is obsolete. The other virtual assistant that has the answer cached may respond by sending an answer obsolete response 319. Some example implementations of the answer obsolete query 317/response 319 are described in further detail below.

As mentioned above, when an answer is cached by a virtual assistant 112, a TTL value is associated with the cached answer 303. In one implementation, the TTL value may be the time that an answer was cached. The answer obsolete query may indicate that an answer must have been cached no earlier than a given time to be considered valid. The virtual assistant that receives the query may compare the received time with the stored TTL. If the answer is older, the response may indicate the cached answer is invalid. In this example implementation, the sender may set the time based on the nature of the query. For queries where older information is still valuable, the time may be set to allow older cached answers to remain valid. When more up to date information is required, the time may be set such that only recently cached information may be considered valid. Further processing of an invalid answer is described with respect to FIG. 4.

In a slightly different implementation, the answer obsolete query 317 may simply be a message that prompts the virtual assistant 112 with the cached answer to respond with the TTL of the cached answer in the answer obsolete response 319 message. Upon receipt, the virtual assistant 104 may compare the TTL with the current time to determine if the answer is sufficiently new to be considered valid for responding to the query 305.

In another implementation, the TTL may be an actual amount of time for the cached answer to live. Upon receipt of the answer obsolete query 317, the virtual assistant 112 may determine if the cached answer is older than its TTL and if so the cached answer is invalid. For example, a TTL may be set as 2 hours. A difference between the current time and the time the answer was cached may be computed. If the time difference is greater than 2 hours, the cached answer may be considered invalid. The answer obsolete response 319 may simply indicate if the answer is still valid.

It should be noted that in such an implementation, the virtual assistant 104 that is initiating the query is not able to provide input as to how old a cached answer can be and yet still be considered valid. However, such an implementation may allow a paid service to specify that answers may be cached for a defined period of time, but after that a new query must be made to the paid service. Such an implementation may help overcome a paid service provider's objection to caching of paid content for reuse at a subsequent time without additional payment.

If, through the answer obsolete query 317/response 319 sequence, it is determined that the cached answer is still valid, the virtual assistant 104 may send the query 321 to the other virtual assistant 112 that has the answer cached. The other virtual assistant may then query response 323 to the virtual assistant. It should be understood that this interaction, to the virtual assistant, appear substantially the same to the interaction that would occur when querying the paid service, with the exception that no payment for the service would be required. The virtual assistant would then use the answer received in the query response 323 to prepare the response to the virtual assistant query 325.

Figure 4:
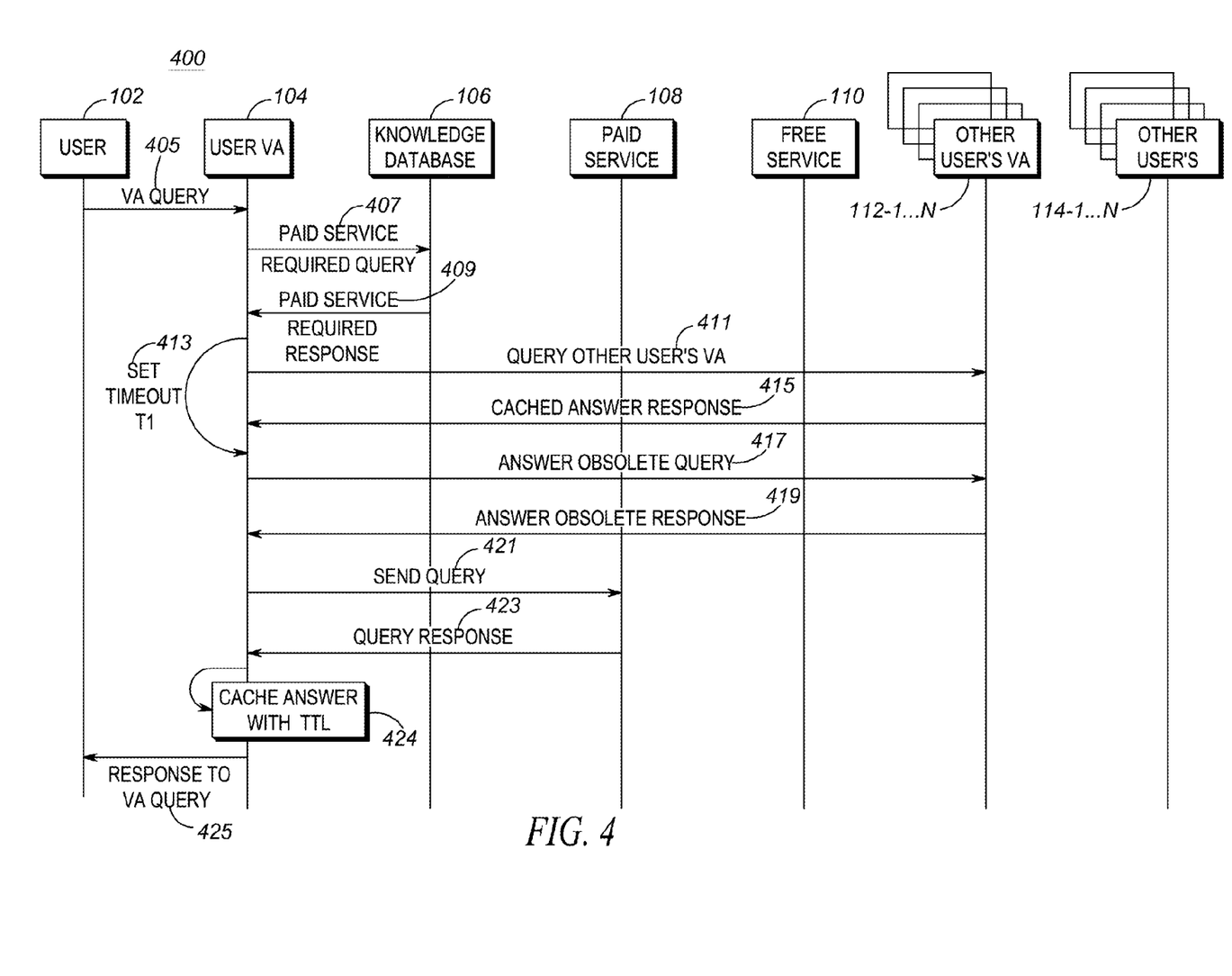
FIG. 4 is another example of a message sequence diagram for managing commercial virtual assistant services when a cached answer is available but is no longer valid.

FIG. 4 is another example of a message sequence diagram for managing commercial virtual assistant services when a cached answer is available but is no longer valid. Sequence diagram 400 includes the elements 102-114 described with respect to FIG. 1 and FIG. 3 and the description of those elements is not repeated here. Steps 405-419 are substantially the same as steps 303-319 and the for purposes of clarity, the description of those items is not repeated here.

In FIG. 4, unlike FIG. 3, the answer obsolete query 417/response 419 sequence may determine that the cached answer 303 is no longer valid. For example, the answer may have exceeded its TTL or may be too old for use by the virtual assistant 104. In some implementations, upon determination that the cached answer is no longer valid, the other virtual assistant 112 may remove the cached answer. The next time a query of other virtual assistants 411 occurs for the same information, the other virtual assistant that has removed the answer will not respond to the query, because it no longer has the answer cached.

The virtual assistant 104 may then send the query 421 to the paid service 108 to retrieve the necessary information. The paid service may then respond to the query 423 with the desired information. As should be understood, use of the paid service would generally incur fees that are charged by the paid service, using whatever charging structure the paid service offers.

Once the virtual assistant has received the information from the paid service, the virtual assistant may cache the answer, including a TTL 424. As explained above, the TTL may be an indicator of when the answer was cached or may be a defined time period for which the answer is valid. If another virtual assistant requires the same information, the process described in FIGS. 2-4 occurs, with virtual assistant 104 now behaving as one of the other virtual assistants 112. The virtual assistant would then use the answer received in the query response 423 to prepare the response to the virtual assistant query 425.

Figure 5:
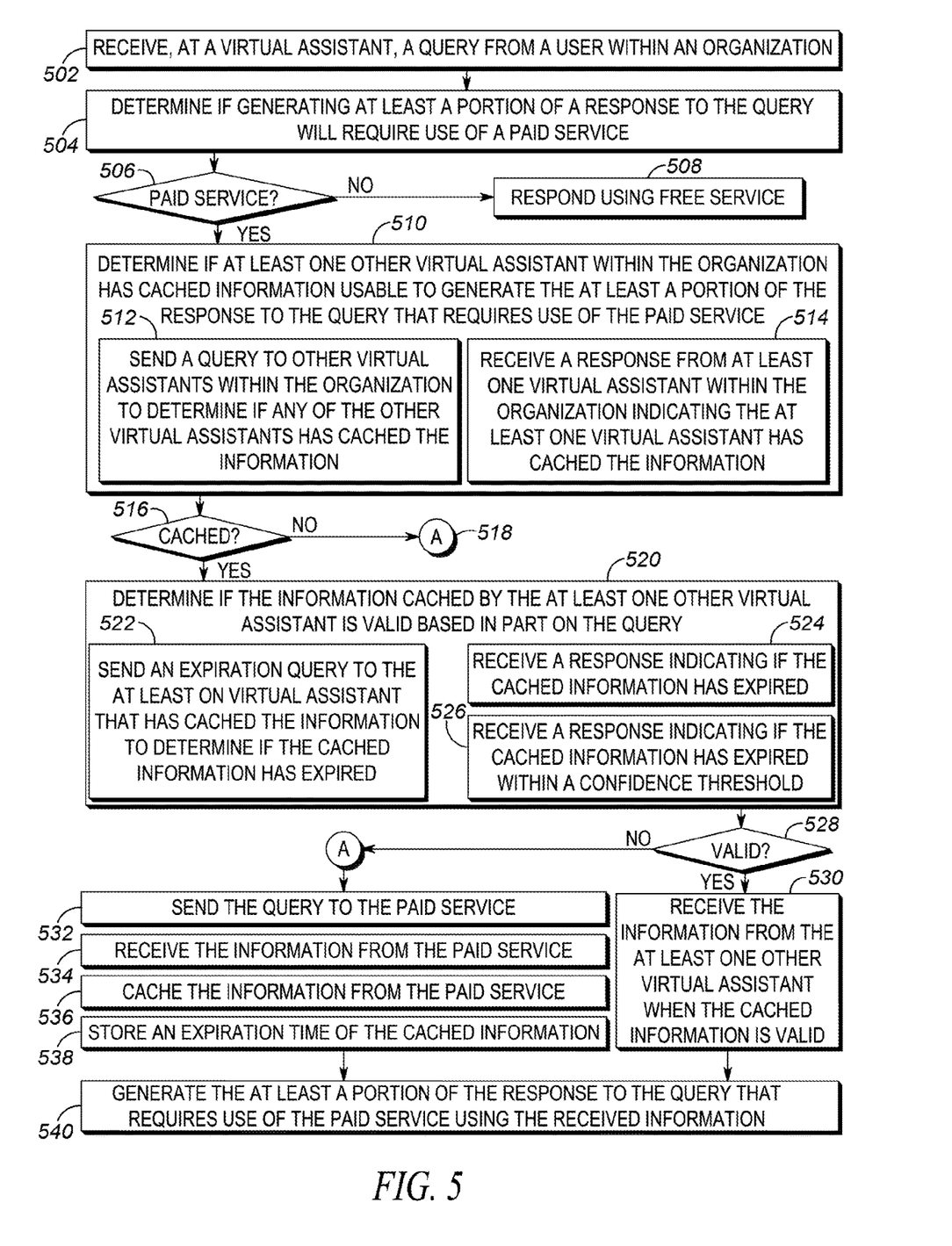
FIG. 5 is an example of a flow chart from the perspective of a virtual assistant receiving a user query.

FIG. 5 is an example of a flow chart from the perspective of a virtual assistant receiving a user query. In block 502, a query from a user within an organization may be received at a virtual assistant. As explained above, the virtual assistant may be specifically associate with a user or may be a centralized service offered to multiple users. The techniques described herein are not limited to any particular type of query. Rather, the techniques are applicable to any type of query that a virtual assistant is capable of responding ot.

In block 504, it may be determined if generating at least a portion of a response to the query will require use of a paid service. Some queries may be answered without using any services at all. Other queries may utilize only free services. Some queries may utilize paid services. For example, a weather service may be a paid service and queries related to the weather would utilize the paid service. It should be further noted that a query may utilize both paid and non-paid services. For example, a user query may be, "What is the expected weather this weekend?" A free calendar service may be used to determine which dates comprise "this weekend" and then those dates may be used to query the paid weather service.

In block 506, if it is determined that generating at least a portion of a response to the query will not require use of a paid service, the process moves to block 508. In block 508, the virtual assistant may respond to the query using free services. If it is determined that the response will need to utilize paid services, the process moves to block 510.

In block 510 it may be determined if at least one other virtual assistant within the organization has cached information usable to generate the at least a portion of the response to the query that requires use of the paid service. As described above, in some implementations, virtual assistants may be associated with individual users and each of those user's virtual assistants may be communicatively coupled via a network, such as a mesh network. In other implementations, the virtual assistants may be central implemented but presented to each user as if they had a dedicated, separate virtual assistant. Regardless of how implemented, it may be determined if another virtual assistant has cached information available that is usable to generate a portion of the response that requires the use of a paid service.

In one implementation, as shown in block 512, a query may be sent to other virtual assistants within the organization to determine if any of the other virtual assistants has cached the information. For example, the query may be sent to the other virtual assistants over the mesh network. In a centralized implementation, the centralized virtual assistant may determine if the information has been cached.

In block 514, a response may be received from at least one virtual assistant within the organization indicating the at least one virtual assistant has cached the information. It should be noted that in some implementations, it may be expected that no more than one virtual assistant would have cached the information at any given time. The reason being that if a query is received by a virtual assistant that requires paid service use, the answer is either available from another virtual assistant or is retrieved from the paid service and cached by the querying virtual assistant. If a previously cached answer is no longer valid, it may be purged.

In block 516 the result of the query is evaluated. If the information is not cached, the process moves to connector A 518. The process that occurs from at connector A is described in further detail below. If the information was cached, the process moves to block 520. In block 520, it may be determined if the information cached by the at least one other virtual assistant is valid based in part on the query. As mentioned above, the techniques described herein differ from convention caching in that a cached piece of information does not have a finite period of validity. The period of validity of a cached item is based in part on the nature of the underlying query. A piece of cached information may be too old to be valid for a first query but may be acceptable for answering a second query. Thus, how long cached information remains valid is dependent on the specific query for which the information will be used.

In one implementation, in block 522 an expiration query may be sent to the at least on virtual assistant that has cached the information to determine if the cached information has expired. In block 524, a response may be received indicating if the cached information has expired. In block 526, a response may be received indicating the cached information is valid when the cached information has expired within a confidence threshold.

In other words, based on the nature of the query, the virtual assistant has determined that although the cached information may be invalid based solely on the time the information was cached, the time elapsed since the expiration was sufficiently short that the virtual assistant may still use the cached information with confidence that the cached information is still accurate for purposes of the particular query. It should be understood that the confidence threshold may vary depending on the nature of any given query. As explained with respect to FIGS. 3 and 4, the determination of if the cached information is valid may be implemented in several different ways. In general, what should be understood is that the virtual assistant performing the query and the virtual assistant that has the information cached communicate with each other to determine if the cached information is valid based on the particular query.

In block 528 a decision is made based on if the cached information is valid. If so, the process moves to block 530, where the information may be received from the at least one other virtual assistant when the cached information is valid. In some implementations, the virtual assistant may send a query to the other virtual assistant, just as if the query was being sent to a paid service.

If the cached information is not valid, the process moves to connector A. In block 532, the query may be sent to the paid service, just as it would have been in the absence of the present invention. In block 534, the information may be received from the paid service. In block 536 the information from the paid service may be cached. If another virtual assistant in the future attempts the same query, the current virtual assistant would then be able to respond indicating that it had the information cached, and the process would begin again at decision block 516. In block 538 an expiration time of the ached information may be stored. The expiration time may be utilized to determine if the cached information is valid. However, it should be understood that the validity of the cached information is not solely dependent on any fixed time period but may also depend on the nature of the underlying query.

In block 540, the at least a portion of the response to the query that requires use of the paid service using the received information may be generated. As mentioned above, the response to the query may involve use of both paid and unpaid services.

In some implementations, a virtual assistant may remove the information from the cache based on the expiration time. In other words, when the information is stored in the cache, a TTL is also stored. When that time arrives, the information may be automatically purged from the cache of that virtual assistant.

In some cases, race conditions may occur. For example, multiple virtual assistants may receive queries that require use of the same paid information within a short period of time. One virtual assistant may be waiting for the response from the paid service, but has not yet received it, and thus does not have the information in its cache yet. Another virtual assistant may then require the same information, but will not get a positive response indicating that any other virtual assistant has cached the information.

To resolve this issue, in some implementations, it may be determined if at least one other virtual assistant within the organization has already queried the paid service for the information. For example, another virtual assistant is waiting for a response form the paid service. In such cases, the virtual assistant may wait until the at least one other virtual assistant within the organization receives the information from the paid service. Thus, the system can avoid duplicate queries to the paid service.

In a similar race condition, two virtual assistants may need to perform the same query to a paid service, but neither one of them has sent the query to the paid service yet. In some implementations, it may be determined if at least one other virtual assistant within the organization is preparing to query the paid service for the information. If so, the virtual assistant that needs to send the same query may negotiate with the at least one other virtual assistant to determine which virtual assistant will send the query to the paid service, wherein the virtual assistant that does not perform the query to the paid service will receive the information from the cache of the virtual assistant that does perform the query to the paid service. In other words, the virtual assistants will negotiate which one will perform the query to the paid service.

Figure 6:
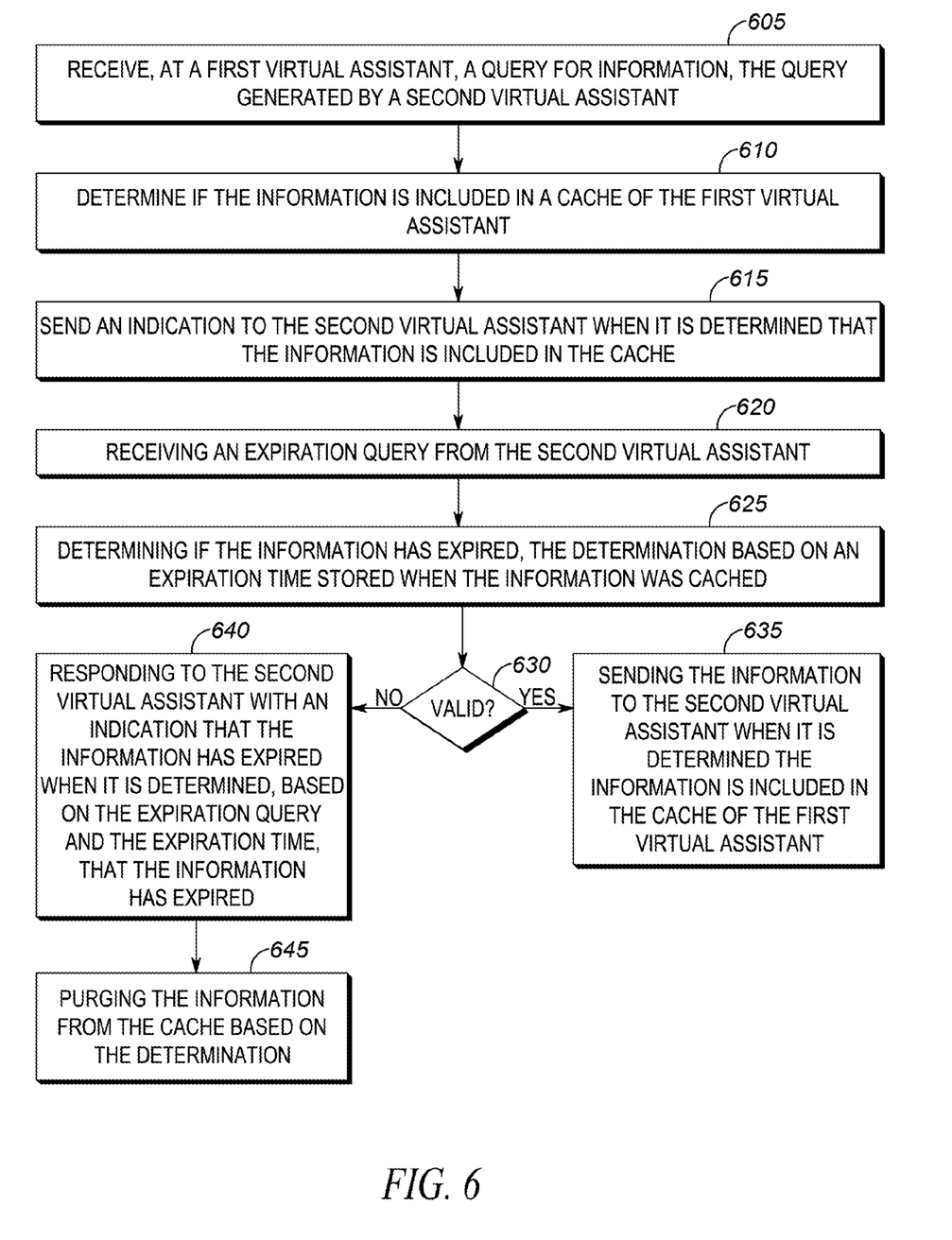
FIG. 6 is an example of a flow chart from the perspective of a virtual assistant responding to a query from another virtual assistant.

FIG. 6 is an example of a flow chart from the perspective of a virtual assistant responding to a query from another virtual assistant. In block 605 a query for information, the query generated by a second virtual assistant may be received at a first virtual assistant. In other words, a virtual assistant may receive a query from another virtual assistant to determine if the receiving virtual assistant has a piece of information in its cache.

In block 610 the first virtual assistant may determine if the information is included in a cache of the first virtual assistant. If, so the first virtual assistant may be able to provide the information to the querying virtual assistant. In block 615 an indication may be sent to the second virtual assistant when it is determined that the information is included in the cache. In other words, the second virtual assistant is informed that the requested piece of information exists in the first virtual assistants cache.

In block 620 the first virtual assistant may receive an expiration query from the second virtual assistant. As described above, just because the requested information may exist in the cache of the first virtual assistant, the information may not be valid depending on the nature of the underlying query.

In block 625 it may be determined if the information has expired, the determination the determination based on an expiration time stored when the information was cached. As explained above, when the information is cached, a TTL may be stored. The TTL may include an expiration time in some implementations. In other implementations, the time the information was cached may be stored. Based on the nature of the query and the TTL, the first and second virtual assistants may determine if the cached information is still valid.

In block 630, if it is determined the information is still valid, the process moves to block 635. In block 635, the first virtual assistant may send the information to the second virtual assistant when it is determined the information is included in the cache of the first virtual assistant. If the information is not valid in block 630 the process may move to block 640 in which the first virtual assistant may respond to the second virtual assistant with an indication that the information has expired when it is determined, based on the expiration query and the expiration time, that the information has expired. Thus, the second virtual assistant is made aware that valid information is not available and may be obtained by querying a paid service. In some implementations, the first virtual assistant may, in block 645, purge the information from the cache based on the determination.

Figure 7:
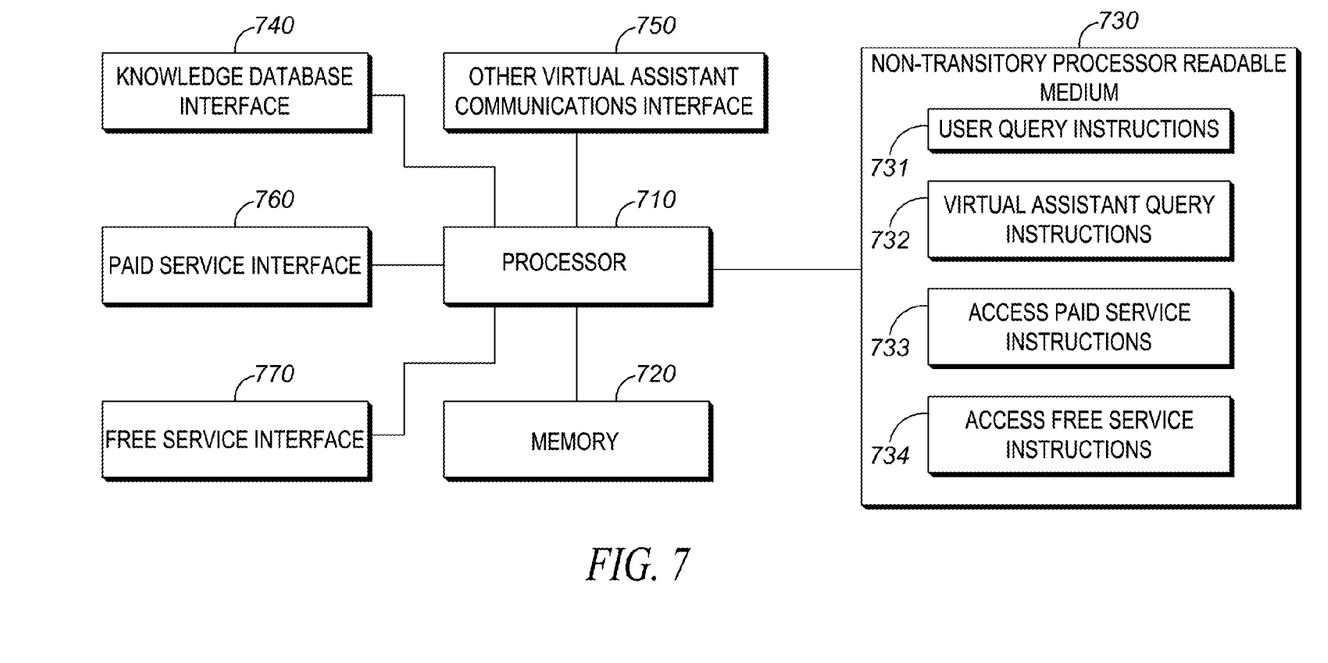
FIG. 7 is an example of a device that can implement the managing commercial virtual assistant services techniques described herein.

FIG. 7 is an example of a device that can implement the managing commercial virtual assistant services techniques described herein. It should be understood that FIG. 7 represents one example implementation of a system that utilizes the techniques described herein. Although only a single processor is shown, it would be readily understood that a person of skill in the art would recognize that distributed implementations are also possible. For example, the various pieces of functionality described above (e.g. virtual assistants, knowledge database, caches, etc.) could be implemented on multiple devices that are communicatively coupled. FIG. 5 is not intended to imply that all the functionality described above must implemented on a single computer.

System 700 may include processor 710, memory 720, non-transitory processor readable medium 730, knowledge database interface 740, other virtual assistant interface 750, paid service interface 760, and free service interface 770.

Processor 710 may be coupled to memory 720. Memory 720 may store a set of instructions that when executed by processor 710 cause processor 710 to implement the techniques described herein. Processor 710 may cause memory 720 to load a set of processor executable instructions from non-transitory processor readable medium 730. Non-transitory processor readable medium 730 may contain a set of instructions thereon that when executed by processor 710 cause the processor to implement the various techniques described herein.

For example, medium 730 may include user query instructions 731. Instructions 731 may cause the processor to receive a user query for information. The processor may communicate with a knowledge database through knowledge database interface 740 to determine if the query may require the use of free services or paid services. The instructions may cause the processor to use other virtual assistant communications interface 750 to communicate with other virtual assistants within the organization when it is determined that the use of paid services would be required to respond to the user query. The processor may query the other virtual assistants to determine if they have information cached to respond to the query without having to utilize the paid service.

After communicating with the other virtual assistants, the processor may determine if the information is valid and if so, may retrieve the information form the other virtual assistant over the interface 750. Otherwise, the instructions 731 may cause the processor to utilize paid service interface 760 to retrieve the information utilizing a paid service by utilizing access paid service instructions 733. The processor may also utilize free service interface 770 to retrieve any information that is necessary to respond to the query by utilizing access free service instructions 734. Instructions 731 generally correspond with those steps described with respect to FIG. 5.

Medium 730 may also include virtual assistant query instructions 732 which may be used to respond to a query from another virtual assistant. For example, instructions 732 may cause the processor to examine a cache to determine if requested piece of information is available. If so, the processor may respond to the requestor indicating the information is available. A determination may be made as to if the information is still valid. In some case, if the information is no longer valid, the processor may cause the information to be purged from the cache. Instructions 732 generally correspond with those steps described with respect to FIG. 6.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc read only memory (CD-ROM), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (IC) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving, at a virtual assistant, a query from a user within an organization;
   determining if generating at least a portion of a response to the query will require use of a paid service;
   determining if at least one other virtual assistant within the organization has cached information usable to generate the at least a portion of the response to the query that requires use of the paid service;
   determining if the information cached by the at least one other virtual assistant is valid based in part on the query;
   receiving the information from the at least one other virtual assistant when the cached information is valid; and
   generating the at least a portion of the response to the query that requires use of the paid service using the received information.

2. The method of claim 1 wherein determining if at least one other virtual assistant within the organization has cached information usable to generate the at least a portion of the response to the query that requires use of the paid service further comprises:
sending a query to other virtual assistants within the organization to determine if any of the other virtual assistants has cached the information; and
receiving a response from at least one virtual assistant within the organization indicating the at least one virtual assistant has cached the information.

3. The method of claim 2 wherein determining if the cached information is valid further comprises:
sending an expiration query to the at least on virtual assistant that has cached the information to determine if the cached information has expired; and
receiving a response indicating if the cached information has expired.

4. The method of claim 3 wherein receiving a response indicating if the cached information has expired further includes determining how long ago the cached information expired, wherein determining if the cached information is valid further comprises:
determining the cached information is valid when the cached information has expired within a confidence threshold.

5. The method of claim 1, further comprising:
determining that no other virtual assistant within the organization has cached information usable to generate the at least a portion of the response to the query that requires use of the paid service;
sending the query to the paid service;
receiving the information from the paid service,
caching the information from the paid service; and
storing an expiration time of the cached information.

6. The method of claim 5 further comprising:
removing the information from the cache based on the expiration time.

7. The method of claim 1 further comprising:
determining if at least one other virtual assistant within the organization has already queried the paid service for the information; and
waiting until the at least one other virtual assistant within the organization receives the information from the paid service.

8. The method of claim 1 further comprising:
determining if at least one other virtual assistant within the organization is preparing to query the paid service for the information; and
negotiating with the at least one other virtual assistant to determine which virtual assistant will send the query to the paid service, wherein the virtual assistant that does not perform the query to the paid service will receive the information from the cache of the virtual assistant that does perform the query to the paid service.

9. A system comprising:
a processor; and
a non-transitory processor readable medium coupled to the processor and containing thereon a set of instructions that when executed by the processor cause the processor to:
receive, at a virtual assistant, a query from a user within an organization;
determine if generating at least a portion of a response to the query will require use of a paid service;
determine if at least one other virtual assistant within the organization has cached information usable to generate the at least a portion of the response to the query that requires use of the paid service;
determine if the information cached by the at least one other virtual assistant is valid based in part on the query;
receive the information from the at least one other virtual assistant when the cached information is valid; and
generate the at least a portion of the response to the query that requires use of the paid service using the received information.

10. The system of claim 9 wherein the instructions to determine if at least one other virtual assistant within the organization has cached information usable to generate the at least a portion of the response to the query that requires use of the paid service further comprises instructions to:
send a query to other virtual assistants within the organization to determine if any of the other virtual assistants has cached the information; and
receive a response from at least one virtual assistant within the organization indicating the at least one virtual assistant has cached the information.

11. The system of claim 10 wherein determining if the cached information is valid further comprises instructions to:
send an expiration query to the at least on virtual assistant that has cached the information to determine if the cached information has expired; and
receive a response indicating if the cached information has expired.

12. The system of claim 11 wherein the instructions to receive a response indicating if the cached information has expired further includes instructions to determine how long ago the cached information expired, wherein determining if the cached information is valid further comprises instructions to:
determine the cached information is valid when the cached information has expired within a confidence threshold.

13. The system of claim 9, further comprising instructions to:
determine that no other virtual assistant within the organization has cached information usable to generate the at least a portion of the response to the query that requires use of the paid service;
send the query to the paid service;
receive the information from the paid service;
cache the information from the paid service; and
store an expiration time of the cached information.

14. The system of claim 13 further comprising instructions to:
remove the information from the cache based on the expiration time.

15. The system of claim 9 further comprising instructions to:
determine if at least one other virtual assistant within the organization has already queried the paid service for the information; and
wait until the at least one other virtual assistant within the organization receives the information from the paid service.

16. The system of claim 9 further comprising instructions to:
determine if at least one other virtual assistant within the organization is preparing to query the paid service for the information; and negotiate with the at least one other virtual assistant to determine which virtual assistant will send the query to the paid service, wherein the virtual assistant that does not perform the query to the paid service will receive the information from the cache of the virtual assistant that does perform the query to the paid service.

17. A method comprising:

receiving, at a first virtual assistant, a query for information, the query generated by a second virtual assistant;

determining if the information is included in a cache of the first virtual assistant;

sending an indication to the second virtual assistant when it is determined that the information is included in the cache;

receiving an expiration query from the second virtual assistant;

determining if the information has expired, the determination based on an expiration time stored when the information was cached; and responding to the second virtual assistant with an indication that the information has expired when it is determined, based on the expiration query and the expiration time, that the information has expired.

18. The method of claim 17 further comprising:

sending the information to the second virtual assistant when it is determined the information is included in the cache of the first virtual assistant.

19. The method of claim 17 further comprising:

determining if the information has expired, the determination based on an expiration time stored when the information was cached; and purging the information from the cache based on the determination.

* * * * *